June 21, 1966   D. D. JORDAN   3,256,806
EXPANDABLE PAN

Filed June 6, 1962   2 Sheets-Sheet 1

INVENTOR.
DAVID D. JORDAN
BY Hobbs & Easton
ATTORNEYS

June 21, 1966     D. D. JORDAN     3,256,806
EXPANDABLE PAN

Filed June 6, 1962     2 Sheets-Sheet 2

INVENTOR.
DAVID D. JORDAN
BY *Hobbs & Easton*
ATTORNEYS

United States Patent Office 3,256,806
Patented June 21, 1966

3,256,806
EXPANDABLE PAN
David D. Jordan, 3619 S. St. Joseph St.,
South Bend, Ind.
Filed June 6, 1962, Ser. No. 200,502
5 Claims. (Cl. 99—444)

The present invention relates to a pan or tray and more particularly to an expandable and disposable pan, tray and the like.

In recent years aluminum foil sheet has been extensively used as oven and pan liners for the purpose of catching the grease and juices extracted from the meat as it is being broiled or cooked by other processes. In this use, pieces of foil of the required sizes are torn from rolls and then formed to the desired shape, often to the inside contour of the pan or grill with sufficient side walls to form a pan-like structure for holding the grease and meat juices. This method, while providing a disposable container or liner, has often been unsatisfactory in that either a separate pan or tray is necessary to retain the foil in the desired shape, or difficulty is encountered in forming the foil into a shape adapted to retain the grease and juices while the meat is cooking and to remove them from the oven or grill without spilling. Further, the foil, which is used as a solid or continuous sheet beneath the meat to catch the grease and juices effectively, has been an imperforate sheet, and hence has prevented the heat and fumes from passing from the fire directly to the meat, often necessary to give it the desired flavor. Preformed disposable containers or liners for catching the grease and juices from the meat have been developed and placed on the market; however, these units have been too expensive and/or too hard to store and handle to be used extensively and, since they are of a single size, have had only limited use. It is therefore one of the principal objects of the present invention to provide a disposable drip pan or tray which can be varied in size to suit the requirements of a particular broiling or other cooking operation, and which is so constructed and designed that the heat and fumes from the fire below can pass therethrough directly to and around the meat while at the same time effectively catching and retaining the grease and juices from the meat.

Another object of the invention is to provide a pan or tray for use in cooking and similar operations, which is shipped, sold and stored in a compact folded form requiring relatively little shelf, cupboard or drawer space, and which can readily be expanded into the desired size when it is ready to be used.

Still another object of the invention is to provide a container structure for use as pans, trays and the like, which is packaged, shipped and stored as a folded, continuous piece from which pieces or sections can be cut or torn and thence expanded into a pan or tray of the desired length having a series of parallel ridges and troughs for supporting meat while being grilled or baked and for simultaneously catching the grease and juices extracted therefrom.

A further object is to provide an expandable tray of the aforesaid type for industrial use having, in its expanded form, a series of parallel troughs for use as an assembly aid in holding piece parts in the order of assembly into a product in an easy to grasp position, said tray being expandable into various lengths for a variety of different uses and contractable into a compact form for storage.

Another object is to provide a relatively inexpensive, light weight, but sturdy, expandable pan or tray of relatively shallow construction which can be used effectively to collect and retain liquids and in which the liquids can be easily and safely carried without spilling.

Additional objects and advantages of the present invention will become apparent from the following description and accompanying drawings, wherein.

Figure 1:
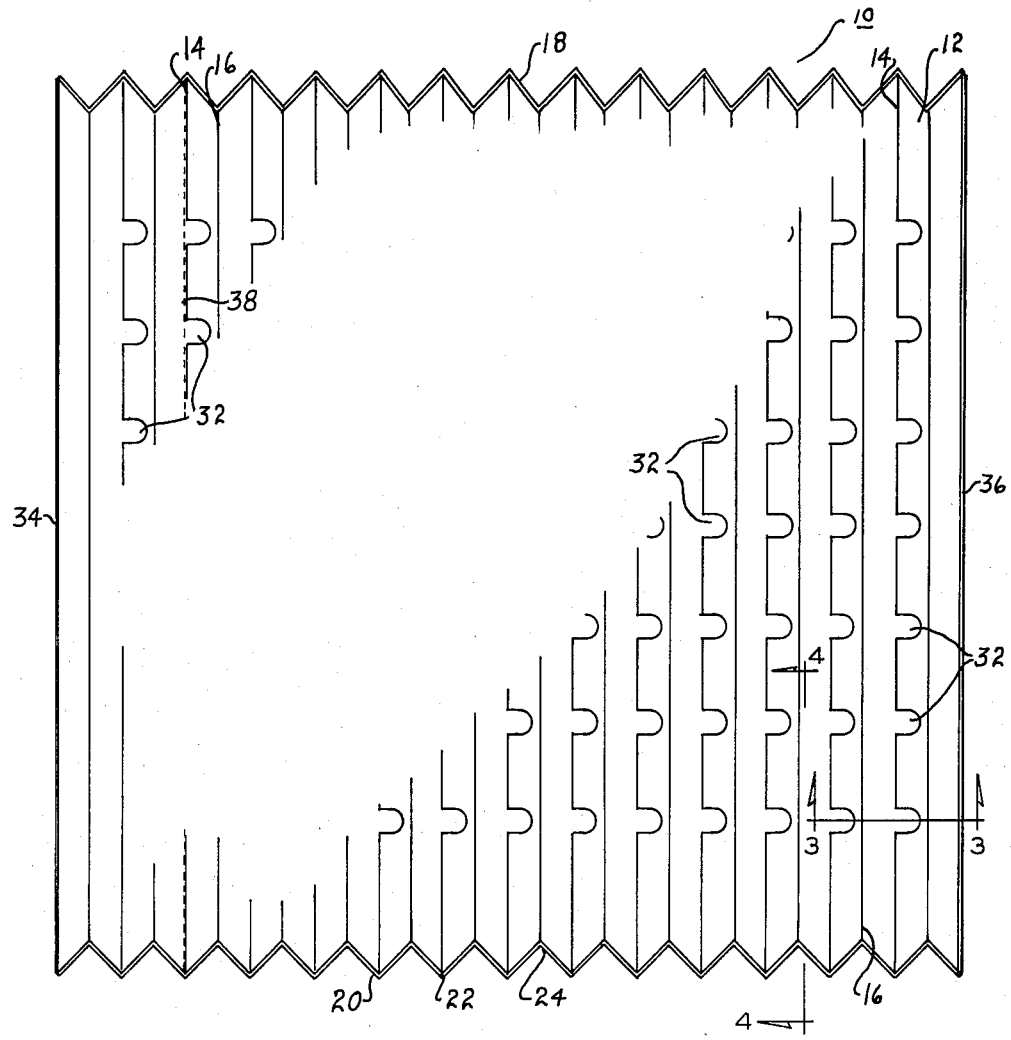
FIGURE 1 is a top plan view of the present expandable pan, showing the pan in its expanded position ready for use.

Referring more specifically to the drawings, the present expandable pan 10 consists of a series of V-shaped parallel arranged troughs 12 having peaks and valleys 14 and 16, respectively. The two sides of the pan 18 and 20 which form the ends of troughs 12 have outwardly projecting edges 22 corresponding to peaks 14 and inwardly extending edges 24 corresponding to the valleys 16 of the troughs. This foregoing construction forms a plurality of well defined trough containers for receiving grease and meat juices as the meat is broiled, either lying on top and supported by the pan or supported separately above the pan on a grill, spit, or other meat supporting structure. The material from which the present pan or tray is formed is preferably sheet aluminum within the range of .001 to .005 inch in thickness; however, heavier or lighter sheet material may be used under certain conditions depending upon the intended use, and other materials besides aluminum, such as for example thin sheet steel or plastic, may be used. Since the present pan or tray is intended for a variety of uses, including a tray for small parts such as screws, washers, bolts, nuts, small springs and the like, plastic or even heavy paper may be used satisfactorily for the pans or trays intended for these uses. However, for drip pans for broiling or other types of cooking, fire proof or fire resistant material, such as aluminum or sheet steel material, is obviously required.

In order to prevent the present pan from insulating the meat from the fire, such as a charcoal fire, while it is being broiled, and also to facilitate the transmission of heat from the fire or other heating element directly to the meat, a series of holes 30 in one side of each trough near the top thereof is provided so that the heat from the fire or other heating element may readily pass upwardly through the pan. The holes 30 are placed at the upper edge of one side of the troughs so that the heat will easily find its way upwardly along the bottom surfaces of the troughs to the holes, and thence pass readily therethrough onto the underside of the meat supported on peaks 14 of the pan. Placing of the holes 30 at the top of the troughs also permits the troughs to serve effectively as grease and meat juice containers without seriously decreasing their capacity or increasing the likelihood of spilling. In order to prevent the grease and meat juices from dripping through holes 30 during the broiling or other cooking operation, each hole is provided with a laterally extending substantially horizontal tab or cover 32 which projects from the peaks between each trough outwardly over holes 30, thus providing an effective shield for the holes for catching the grease and draining it to one or the other troughs on either side of the respective peak. It is apparent from FIGURE 3, in particular, that the tabs 32 do not appreciably restrict holes 30 or interfere with the hot fumes passing upwardly into and through the holes and into the pan beneath the meat. While these tabs are shown extending horizontally, they may be tilted upwardly or downwardly at the free end in order to facilitate drainage of the grease and meat juices therefrom into the troughs during the cooking operation.

Figure 2:
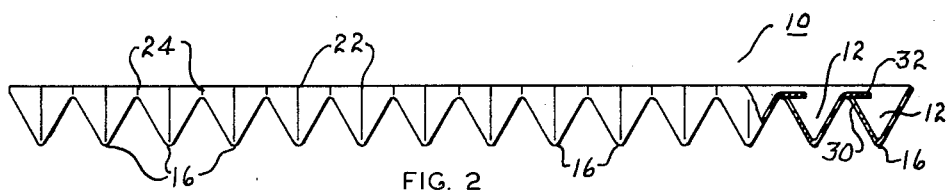
FIGURE 2 is a side elevational and partial cross sectional view of the expandable pan shown in FIGURE 1.
Figure 3:
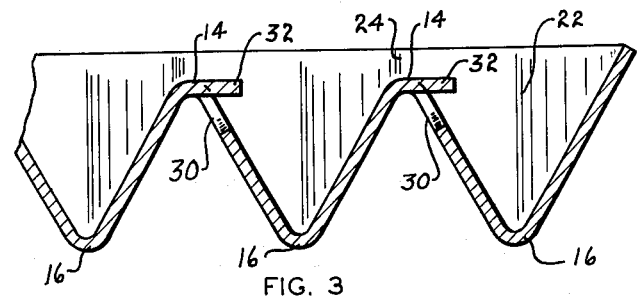
FIGURE 3 is an enlarged fragmentary cross sectional view of the expandable pan shown in the preceding figures, the section being taken on line 3—3 of FIGURE 1.
Figure 4:
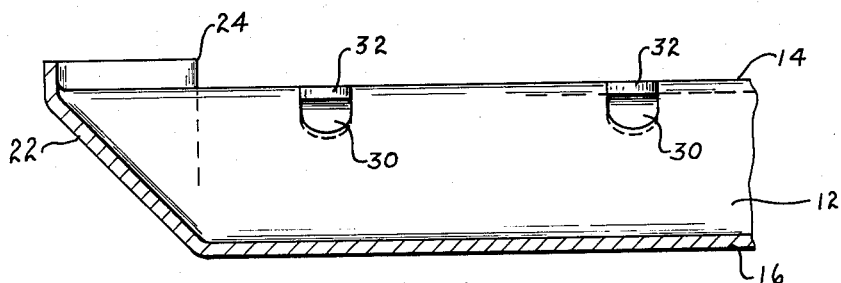
FIGURE 4 is an enlarged fragmentary cross sectional view of the pan shown in FIGURES 1 and 2, the section being taken on line 4—4 of FIGURE 1.
Figure 5:
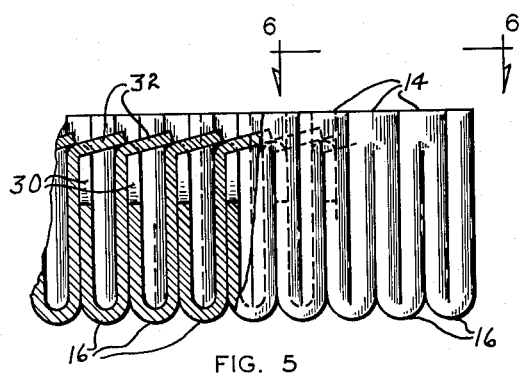
FIGURE 5 is an enlarged partial cross sectional view of the present expandable pan showing the pan in its folded position.
Figure 6:
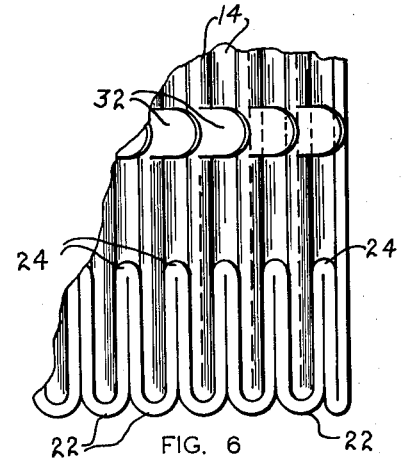
FIGURE 6 is a fragmentary plan view of a portion of the present expandable pan shown in FIGURE 5, with the pan in its folded position.
Figure 7:
FIGURE 7 is a diagrammatical side elevational view of the present pan showing the manner in which it is folded for storage and unfolded when it is to be used.

One of the primary features of the present invention is the folded construction which permits the pan or tray to be easily shipped and stored and then readily expanded into the usable condition, as shown in FIGURES 1 and 2. The manner in which the pan or tray is folded is illustrated in FIGURES 5, 6 and 7, wherein it assumes an expandable accordion appearance illustrated in FIGURE 7. While the pan is in its folded condition, the sides of troughs 12 are pressed together in contact with one another to form a U-shaped cross sectional configuration, and tabs 32 overlap one another, forming a compact package or unit. If the pans are sold in sections of predetermined sizes, they are merely expanded by pulling the two ends 34 and 36 apart whenever the pan is prepared for use. Since the length of the pan, i.e. the distance between the two ends 34 and 36, may be varied without substantially altering the size of troughs 12, the pans may be expanded to the required length over a relatively wide range. When the pan is in its folded or contracted position, as shown in FIGURES 5 and 6, the tabs project slightly upwardly, overlapping one another without interfering with the compact folding of the side walls of the troughs against one another. As the pan is expanded, the tabs merely rotate downwardly with the respective side walls and peaks to which they are attached to a substantially horizontal position, as shown in FIGURES 3 and 4.

Another advantage of the present expandable pan is that it can be formed as a continuous structure of sufficient length to form a substantial number of individual pans of various sizes as required. The structure is formed in the same manner as previously described, i.e. in the folded condition as illustrated in FIGURES 5 and 6, and placed flatwise in a container or other carton. Whenever a pan or tray is needed, one end of the structure is withdrawn from the container and severed from the structure. The section thus obtained is then expanded to the desired length and used in the same manner as the individual pans or trays previously described. The package container preferably includes a flap with a serrated edge or the like for severing the withdrawn section from the structure. The structure may be formed in rolls and made available in a dispenser having a reel or other coil supporting means therein and a means for severing sections withdrawn from the rolls. The continuous structure may be scored or otherwise weakened at various places, as illustrated at numeral 38, so that it can be easily severed at predetermined pan lengths, such as expanded pans of eight or twelve inches in length.

While the present invention has been directed primarily to a drip pan for broiling or for use in other kinds of cooking, the pan may be satisfactorily used for a variety of different purposes, as previously mentioned. In many of these uses, the ventilating holes 30 are not required, and in anticipation of these uses, the pan or tray may not contain the holes or tabs 32. In the claims the word "pan" is to mean and include the inventive structure, regardless of whether it is used as a pan, tray or support, or whether it is used in cooking or as an article or liquid container.

While only one embodiment of the present invention has been described in detail herein, various changes and modifications may be made to satisfy requirements without departing from the scope of the present invention.

I claim:

1. An expandable disposable pan, comprising a series of parallel V-shaped troughs of aluminum sheet material joinned together in side-by-side relationship at the upper edges thereof, the ends of said troughs extending downwardly and inwardly from the top to the bottom thereof at approxiamtely a 45 degree angle, a foldable end member at each end of said troughs joined to the end members of the adjacent troughs, perforations forming vents spaced along the upper edge of one side of each trough, and tabs for each of said perforations substantially the same size as said perforations joined to the top of the adjacent trough and projecting substantially horizontally over the respective perforation in spaced relation thereto.

2. An expandable disposable pan, comprising a series of V-shaped troughs of sheet metal joined together in side-by-side relationship at the upper edges thereof, the ends of said troughs extending downwardly and inwardly from the top to the bottom thereof at approximately a 45 degree angle, a foldable end member at each end of said troughs joined to the end members of the adjacent troughs, perforations spaced along the upper edge of one side of each trough, and covers for each of said perforations joined to the top of the adjacent trough and projecting in horizontal position over the respective perforation in spaced relation thereto.

3. A disposable pan, comprising a series of V-shaped troughs of sheet material joined together in side-by-side relationship at the upper edges thereof, the ends of said troughs extending downwardly and inwardly from the top to the bottom thereof, a foldable end member at each end of said troughs joined to the end members of the adjacent troughs, holes spaced along the upper edge of one side of each trough, and covers for each of said holes connected to the top of the adjacent trough and projecting in horizontal position over the respective hole.

4. A prefabricated expandable pan construction in folded position, comprising a series of parallel U-shaped structures joined together at their tops in side-by-side relationship at the upper edges thereof, the ends of said U-shaped structures extending downwardly and inwardly from the top to the bottom thereof at approximately a 45 degree angle, a folded end member at each end of said structures joined to the end members of the adjacent structures, perforations spaced along the upper edge of one side of each structure, and tabs for each of said perforations joined to the top of the adjacent structure and projecting in horizontal position over the respective perforation in overlapping relationship with an adjacent tab, said folded pan construction being adapted to expand in sections to form a series of V-shaped troughs with perforations along the top thereof.

5. A folded expandable pan construction, comprising a series of parallel U-shaped structures joined together at their tops in side-by-side relationship at the upper edges thereof, the ends of said U-shaped structures extending downwardly and inwardly from the top to the bottom thereof, a folded end member at each end of said structures, joined to the end members of the adjacent structures, holes spaced along the upper edge of one side of each structure, and covers for each of said holes connected to the top of the adjacent structure and projecting in horizontal position over the respective hole in overlapping relationship with an adjacent cover.

References Cited by the Examiner

UNITED STATES PATENTS

| | | |
|---|---|---|
| D. 177,360 | 4/1956 | Becker et al. |
| 833,529 | 10/1906 | Jones _____ 99—450 X |
| 1,531,448 | 3/1925 | Milam. |
| 2,656,958 | 10/1953 | Austin _____ 150—0.5 X |
| 2,815,883 | 12/1956 | Robins. |
| 2,875,683 | 3/1959 | Burns. |
| 2,880,860 | 4/1959 | Gardiner et al. _____ 206—58 |
| 3,113,505 | 12/1963 | Keppler _____ 229—3.5 X |

THERON E. CONDON, *Primary Examiner.*

J. R. GARRETT, *Assistant Examiner.*